US011853785B1

(12) United States Patent
Tsai et al.

(10) Patent No.: US 11,853,785 B1
(45) Date of Patent: Dec. 26, 2023

(54) VIRTUAL MACHINE CLONING AND RESOURCE CONFIGURATION

(71) Applicant: Amazon Technologies, Inc., Seattle, WA (US)

(72) Inventors: Oleksii Tsai, Kenmore, WA (US); Nikolay Krasilnikov, Seattle, WA (US); Anton Valter, Renton, WA (US); Alexey Gadalin, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 491 days.

(21) Appl. No.: 16/806,619

(22) Filed: Mar. 2, 2020

(51) Int. Cl.
*G06F 9/455* (2018.01)
*G06F 9/50* (2006.01)
*H04L 67/10* (2022.01)

(52) U.S. Cl.
CPC ........ *G06F 9/45558* (2013.01); *G06F 9/5077* (2013.01); *H04L 67/10* (2013.01); *G06F 2009/45562* (2013.01); *G06F 2009/45579* (2013.01); *G06F 2009/45591* (2013.01)

(58) Field of Classification Search
None
See application file for complete search history.

(56) References Cited

U.S. PATENT DOCUMENTS

| 10,318,166 | B1* | 6/2019 | Tummala | G06F 3/0631 |
| 10,990,464 | B1 | 4/2021 | Ping et al. | |
| 2013/0174140 | A1* | 7/2013 | Barthel | G06F 8/65 717/174 |
| 2015/0058475 | A1* | 2/2015 | Earl | G06F 9/45558 709/224 |
| 2016/0378546 | A1* | 12/2016 | Brouwer | G06F 9/4856 718/1 |
| 2017/0180387 | A1* | 6/2017 | Hayashi | H04L 63/102 |
| 2017/0206021 | A1* | 7/2017 | Nakajima | G06F 9/455 |
| 2019/0235904 | A1* | 8/2019 | Epping | G06F 3/0664 |
| 2019/0310880 | A1 | 10/2019 | Gupta et al. | |

* cited by examiner

*Primary Examiner* — Wynuel S Aquino
(74) *Attorney, Agent, or Firm* — Knobbe, Martens, Olson & Bear LLP (57) ABSTRACT

Generally described, one or more aspects of the present application relate to an instance cloning service for cloning a running virtual machine instance and configuring the resources of the new virtual machine instance created by cloning the running virtual machine instance. For example, the instance cloning service can create the new virtual machine instance and attach it to a storage volume to which the original virtual machine instance is attached. The instance cloning service may subsequently move the new virtual machine instance to another storage volume (e.g., based on a user request or based on the performance of the instances). Alternatively, upon cloning, the instance cloning service may attach the new virtual machine instance to a new storage volume. For example, the instance cloning service may use copy-on-write to provide the new virtual machine instance with its own storage volume.

18 Claims, 7 Drawing Sheets

VIRTUAL MACHINE CLONING AND RESOURCE CONFIGURATION

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

DETAILED DESCRIPTION

Introduction

Generally described, aspects of the present disclosure relate to methods, systems, and processes for managing the cloning of a virtual machine instance running on one physical host machine onto another physical host machine within a networked distributed computing system, such as a cloud provider network. In some implementations, the described technology can beneficially facilitate faster and more efficient virtual machine cloning and management of resources attached to the cloned virtual machines within a cloud environment. One example of such resources includes block storage volumes implemented on block storage servers within the networked distributed computing system. In general, a block storage volume can correspond to a logical collection of data, such as a set of data maintained on a data server in the cloud on behalf of a user.

Operating systems provide certain systems calls that can utilized to spawn additional threads and processes for parallel execution. However, such system calls are typically limited to a single-host environment and cannot easily be applied to the multi-host environment context. For example, although these system calls are used to clone an existing thread or process on the same host machine, such system calls do not provide the ability to clone an existing virtual machine and further do not provide the ability to clone such an existing virtual machine onto a physical host machine other than that hosting the existing virtual machine.

The presently disclosed technology addresses these deficiencies by providing a cloud provider network that can clone virtual machines (also referred to herein as virtual compute instances, virtual machine instances, or simply instances) running on corresponding physical host machines as well as manage the resources utilized by the cloned virtual machines. By allowing additional virtual machines to be cloned from a running virtual machine (as opposed to being provisioned from scratch or from a previously stored copy of a virtual machine), the system reduces the amount of time required to provision and configure such additional virtual machines. Further, by providing various options for managing the resources of the new virtual machines, the system provides flexibility to the users of the cloud provider network. For example, by allowing the original virtual machine and the new virtual machine to share the same block storage volume (e.g., the one used by the original virtual machine prior to the cloning), the system may reduce the amount of time required to clone the original virtual machine. As another example, by allowing the original virtual machine and the new virtual machine to be attached to different block storage volumes (e.g., immediately after cloning or after allowing them to share the same block storage volume for a period of time), the system may better accommodate the levels of usage and/or diverging needs of the original and new virtual machines.

More specifically, after it has been determined that a virtual machine instance running on a first host system (also referred to as the "source" or the "source location") is a candidate for cloning, a suitable second host computer system (also referred to as the "target" or the "target location") may be identified and prepared for the cloning process by a cloning manager. This preparation may include ensuring that the right operating system and/or applications are running on the target location and that the target location has sufficient resources available to host the virtual machine instance that is being cloned.

A new instance of the virtual machine (also referred to as the "new virtual machine instance" or the "new instance") may then be created on the target with the same configuration as the running virtual machine instance (also referred to as the "original virtual machine instance" or the "original instance") by the cloning manager, and memory and state information from the original virtual machine instance may copied to the new virtual machine instance while the original virtual machine instance continues to run. Some or all of the memory and/or state of the running virtual machine instance may be copied to the new virtual machine instance so that the difference between the two virtual machines is minimized. This copying may keep the differences between the two virtual machines to a minimum by forwarding any changes to the memory or state of the original virtual machine instance to the new virtual machine instance. Such changes to the memory or state of the original virtual machine instance may occur as a result of, for example, one or more application programming interface ("API") requests received by the original virtual machine instance or the cloud provider network. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In some cases, the original virtual machine instance may be locked by the cloning manager, so that any final changes to the memory and/or state of the original virtual machine instance may be propagated to the new virtual machine instance, ensuring that the two virtual machine instances are sufficiently the same or identical upon the completion of the cloning process. In an embodiment, the final changes to the memory and/or state of the original virtual machine instance can be propagated to the new virtual machine instance so that the two virtual machine instances are identical. In some embodiments, some of the states and/or additional changes are copied over to the new virtual machine instance after the new virtual machine instance has been booted up and is made available to the entity that requested the cloning.

In an example of how a cloning manager may orchestrate the cloning of a virtual machine instance, a user may have access to a virtual machine instance running on a first physical host machine provided by a cloud provider network. In some cases, the user may request that the virtual machine instance be cloned to provide additional compute capacity. Alternatively, in other cases, the cloud provider network may determine that one of its internal virtual machine instances should be cloned to provide additional compute capacity. Once the cloning manager of the cloud provider network determines that a running virtual machine instance is to be cloned, the new virtual machine instance may be instantiated on a second physical host machine the memory and/or state of the original virtual machine instance may be copied onto the second physical host machine. During this copy, the virtual machine instance will continue to operate on the first physical host machine. When the cloning is complete, the user can continue to access the original virtual machine instance, and the user is additionally granted access to the new virtual machine instance.

As will be appreciated by one of skill in the art in light of the present disclosure, the embodiments disclosed herein improve the ability of computing systems, such as block store systems and virtual compute systems, to provide mechanisms for cloning running virtual machines. By allowing additional virtual machines to be cloned from a running virtual machine (as opposed to being provisioned from scratch or from a previously stored copy of a virtual machine), the system reduces the amount of time required to provision and configure such additional virtual machines. Further, by providing various options for managing the resources of the new virtual machines, the system provides flexibility to the users of the cloud provider network. Prior techniques generally relied on provisioning new virtual machines from scratch or from a previously stored copy of another virtual machine, which took longer and was more cumbersome due to the number of resources such as the memory, storage, processing, and networking resources needed to be initialized for the virtual machines. In contrast, embodiments of the present disclosure enable users to clone their running virtual machines and configure the resources of the newly created virtual machines based on their needs, thereby providing reduced latencies while providing flexibility around resource configuration (e.g., whether to configure the virtual machines to share resources, to be connected to separate sets of resources, or a combination of both. The presently disclosed embodiments therefore address technical problems inherent within computing systems, such as the difficulty of provisioning new virtual machines from running virtual machines, especially across different physical host systems. These technical problems are addressed by the various technical solutions described herein, including the copying of the current states of the running virtual machine's resources, attaching the new virtual machine to the same block storage volume as the running virtual machine, and/or attaching the virtual machines to different block storage volumes. Thus, the present disclosure represents an improvement on existing block store systems and virtual compute systems, and computing systems in general.

These and other aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

Overview of Example Computing Environment for Instance Cloning Service

Figure 1:
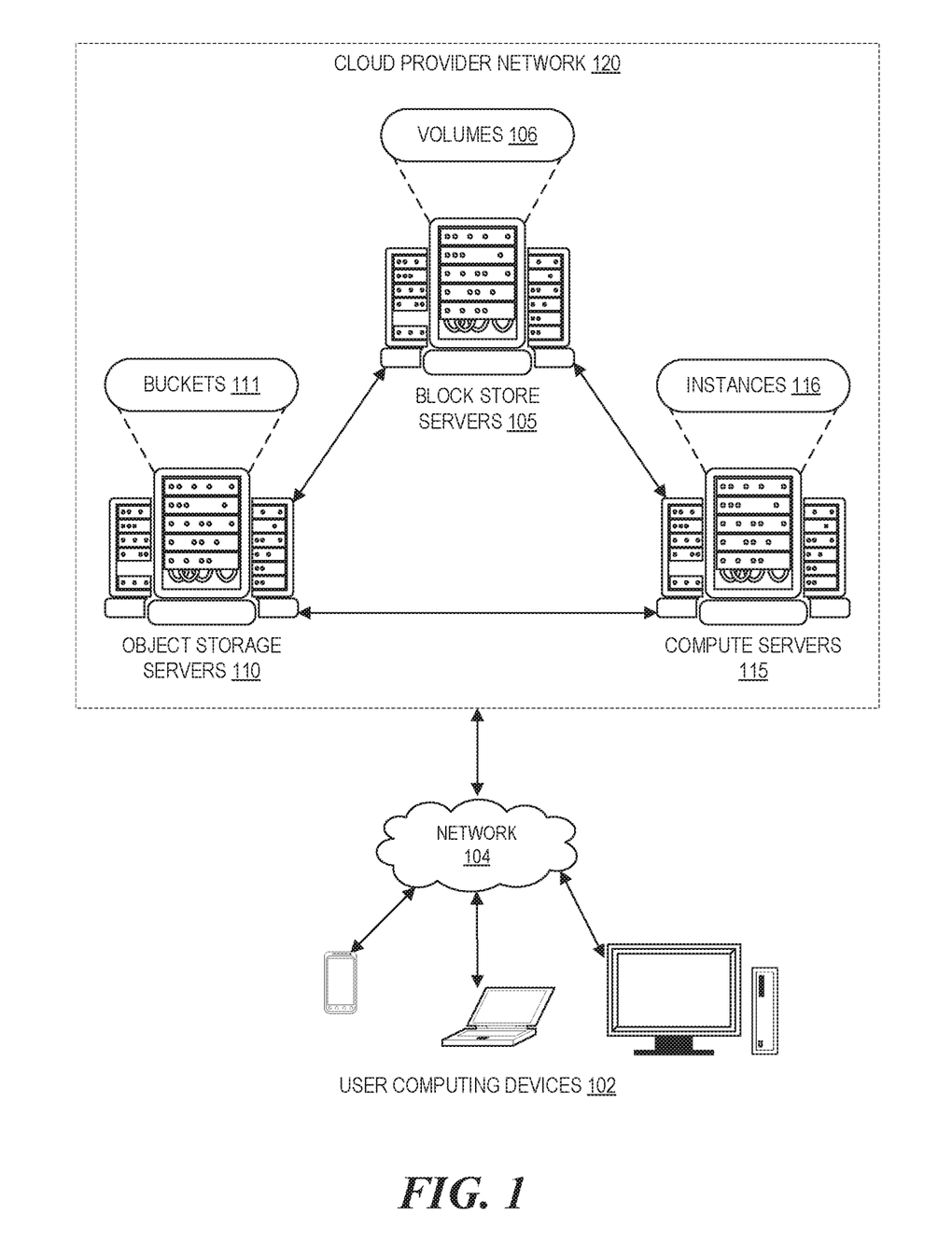
FIG. 1 depicts a schematic diagram of a cloud provider network in which various embodiments according to the present disclosure can be implemented.

FIG. 1 depicts an example computing environment 100 including a cloud provider network 120 in which the disclosed instance cloning service can be implemented. The cloud provider network 120 may be a cloud provider network (sometimes referred to as a cloud provider system or simply a "cloud"). The cloud refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and the hardware and software in cloud provider data centers that provide those services. It will be appreciated that the disclosed virtual machine cloning and resource management techniques may be implemented in non-elastic computing environments as well.

The cloud provider network 120 can be accessed by user computing devices 102 over a network 104. The cloud provider network 120 includes one or more block store servers 105, one or more object storage servers 110, and one or more compute servers 115 that are in networked communication with one another and with the network 104 to provide users with on-demand access to computing resources including volumes 106, buckets 111, and instances 116, among others. These particular resources are described in further detail below. Some implementations of cloud provider network 120 can additionally include domain name services ("DNS") servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can provide on-demand, scalable computing platforms to users through the network 104, for example allowing users to have at their disposal scalable "virtual computing devices" via their use of the block store servers 105, object storage servers 110, and compute servers 115. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability. The cloning described herein may be performed within the same regions or available zone or across multiple regions or available zones.

Turning specifically to the roles of the different servers within the cloud provider network 120, the compute servers 115 include one or more servers on which provide resizable computing capacity to users for building and hosting their software systems. The compute servers 115 and associated control plane functionality can provide an elastic compute cloud service of the cloud provider network. Compute services can be referred to as a virtual compute service, or cloud compute service, in various implementations. Users can use the compute servers 115 to launch as many virtual computing environments, referred to as virtual compute instances, virtual machine instances, virtual machines, or "instances" 116, as they need. Instances 116 can have various configurations of processing power, memory, storage, and networking capacity depending upon user needs. The compute servers 115 can also include computer storage for temporary data used while an instance is running, however as soon as the instance is shut down this data is lost.

The block store servers 105 provide persistent data storage for the compute servers 115 in the form of volumes 106, each of which represents a virtualized, network-accessible block-storage device (e.g., a virtual "hard disk"). The block store servers 105 and associated control plane functionality can provide an elastic block store service of the cloud provider network. Block storage services can be referred to as a cloud disk service, managed disk service, storage area network service, persistent disk service, or block volume service, in various implementations. Data of volumes 106 may be encrypted or unencrypted. The block store servers 105 include one or more servers on which data is stored as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 kB, 256 kB, 512 kB, or larger, depending upon the implementation.

Block storage volumes 106, which can be treated as an individual hard drive ranging for example from 1 GB to 1 terabyte TB (or more) in size, are made of one or more blocks stored on the block store servers 105. Although treated as an individual hard drive, it will be appreciated that a volume may be stored as one or more virtualized devices implemented on one or more underlying physical host devices. Volumes 106 may be partitioned a small number of times (e.g., up to 16) with each partition hosted by a device of the cloud provider network 120 that has the ability to transfer data at around 1 GB per second ("Gbps") in some implementations. These volumes provided persistent, dedicated storage that can be attached to particular instances of the compute servers 115. Each volume may be attached to a single instance running on a compute server 115, and can be detached from that instance and re-attached to another. The block store servers 105 may have built-in redundancy for volumes by replicating the volume across multiple servers within an availability zone, which means that volumes will not fail if an individual drive fails or some other single failure occurs.

In general, a volume can correspond to a logical collection of data, such as a set of data maintained on behalf of a user. The data of the volume may be replicated between multiple devices within a distributed computing system, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume (e.g., those requested by one or more virtual machine instances to which the volume is attached), and to propagate any writes to the secondary replica (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas.

Attachment between a volume and an instance refers to the establishment of a connection between a client of the instance and the volume. This connection may be referred to as a "lease" in some implementations, and it enables to instance to view the volume as if it were a local storage drive, even though the volume and instance may be hosted on different physical machines and communicating over a network. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance. For example, in some implementations, at least a subset of virtualization management tasks may be performed at one or more offload cards so as to enable more of the processing capacity of the host to be dedicated to client-requested compute instances e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management, input/output virtualization to network-attached storage volumes, local migration management tasks, instance health monitoring, and the like.

The object storage servers 110 represent another type of storage within the cloud provider network 120. The object storage servers 110 and associated control plane functionality can provide an object-based storage service of the cloud provider network. Object-based storage services can be referred to as a blob storage service, cloud object storage service, or cloud storage service, in various implementations. The object storage servers 110 include one or more servers on which data is stored as objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, such that authorized access to them can be obtained through requests from networked computing devices in any location, including the virtual machines cloned according to the techniques described herein. Each bucket 111 is associated with a given user account. Users can store as many objects as desired within their buckets, can write, read, and delete objects in their buckets, and can control access to their buckets and the objects contained therein. For example, a new virtual machine created by cloning an original virtual machine may have access to the same buckets as the original virtual machine or a separate set of buckets. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of the vast scalability and metadata characteristics of the object storage servers 110. The object storage servers 110 can support highly parallel data accesses and transfers.

The object storage servers 110 can offer even greater redundancy than the block store servers 105, as the object storage servers 110 can automatically replicate data into multiple availability zones. The object storage servers 110 also have different data throughput than the block store servers 105, for example around 20 Mbps for a single stream of data. While the object storage servers 110 can be used independently from the instances 116 and volumes 106 described above, they can also be used to provide data backup (e.g., object-stored backups of volume data).

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. User computing devices 102 can include any network-equipped computing device, for example desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

Virtual Machine Instances, Migration, and Cloning

The cloud provider network 120 may be a cloud provider network that offers virtual compute instances (also referred herein to as virtual machines or virtual machine instances) with varying computational and/or memory resources. In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Migration refers to moving virtual machine instances (and/or other resources) between hosts in a cloud computing network, or between hosts outside of the cloud computing network and hosts within the cloud. There are different types of migration including live migration and reboot migration. Techniques for various types of migration involve managing the critical phase—the time when the virtual machine instance is unavailable to the customer—which should be kept as short as possible.

During a reboot migration, the customer experiences an outage and an effective power cycle of their virtual machine instance. For example, a control plane service can coordinate a reboot migration workflow that involves tearing down the current instance on the original host (the "source host") and subsequently creating a new virtual machine instance on the new host (the "target host"). The instance is rebooted by being shut down on the original host and booted up again on the new host.

Live migration refers to the process of moving a running virtual machine instance between different physical machines without significantly disrupting the availability of the virtual machine instance (e.g., the down time of the virtual machine instance is not noticeable by the end user).

When the control plane initiates a live migration workflow it can cause the creation of a new "inactive" domain associated with the instance on a target host, while the original domain for the instance continues to run as the "active" domain (e.g., the destination or address at which the virtual machine can be accessed) on the source host. Memory (including any in-memory state of running applications), storage, and network connectivity of the virtual machine are transferred from the original host with the active domain to the destination host with the inactive domain. For example, a local migration manager running on the source can send memory pages to the target host (also referred to as the "state" of the instance), track changes to the memory pages, and continue sending the changed pages to the target host. The instance may be briefly paused to prevent state changes while transferring a final set of memory contents to the target host. Thereafter, one or more of the control plane, the local migration manager, and the hypervisors (on the source and target hosts) can transition the inactive domain to become the active domain and demote the original active domain to become the inactive domain (sometimes referred to as a "flip"), after which the instance begins running on the target host, and the inactive domain can be discarded. Additional details relating to virtual machine instance migration are provided in U.S. application Ser. No. 16/442,325 (U.S. Pat. App. Pub. No. 2019/0310880), titled "MANAGED ORCHESTRATION OF VIRTUAL MACHINE INSTANCE MIGRATION," which is incorporated herein by reference in its entirety. Although memory is used as an example herein, similar techniques can be applied to other resources such as CPU, local storage, remote storage, and network resources.

Cloning refers to the process of moving a running virtual machine instance across different physical machines without significantly disrupting the availability of the virtual machine instance (e.g., the down time of the virtual machine instance is not noticeable by the end user). When the control plane initiates a cloning workflow, it can cause the creation of a new instance on a target host, while the original instance continues to run on the source host. Memory (including any in-memory state of running applications), storage, and network connectivity of the virtual machine are copied from the original host onto the target host. For example, a local cloning manager running on the source host can send memory pages to the target host, track changes to the memory pages, and continue sending the changed pages to the target host. The instance may be briefly paused to prevent state changes while transferring a final set of memory contents to the target host. Thereafter, one or more of the control plane, the local cloning manager, and the hypervisors (on the source and target hosts) can attached the new instance to the shared resources of the original instance (e.g., a block storage volume of the original instance) and/or to its own set of resources (e.g. a new block storage volume having the same state as the block storage volume of the original instance at the time of cloning). Unlike migration, cloning results in the original instance continuing to run along with the new instance. Upon cloning, the resources of the original instance and the new instance such as memory and storage may initially be in the same state but may subsequently diverge depending on the operation of the instances. In other embodiments, the resources of the new instance reflect the state of only a portion of the resources of the original instance that was specified by the entity requesting the cloning (e.g., client computing device) or determined to be relevant by the entity performing the cloning (e.g., the cloud provider network) and do not reflect at least a portion of the state of the resources of the original instance. For example, in such embodiments, data stored in the memory of the original instance but marked for garbage collection or data stored in sections of the memory of the original instance that are unallocated or unused by the original instance may not be copied over to the new instance.

In some embodiments, one or more parameters associated with the new instance are different from those associated with the original instance. For example, the original instance may have 4 GB of memory allocated but the cloning can be performed such that the new instance has 8 GB allocated. Some examples of the parameters that may be changed due to cloning include the instance hardware type, computational resources (e.g., number, type, and configuration of CPU cores), memory resources (e.g., capacity, type, and configuration of local memory), storage resources (e.g., capacity, type, and configuration of locally accessible storage), and/or network resources (e.g., characteristics of its network interface and/or network capabilities), to name a few. The amount of resources may be increases or decreased. In other embodiments, cloning does not change the resource amounts (e.g., the resource amounts of the original instance are identical to the resource amounts of the new instance).

In some embodiments, the request to clone the original instance includes certain overrides that change the cloning behavior. For example, the request may specify that the memory should not be copied over to the new instance. In such an example, the state of the remaining resources may be copied over to the new instance, but the state of the memory is not copied over to the new instance.

Overview of Example Instance Cloning Service

Figure 2:
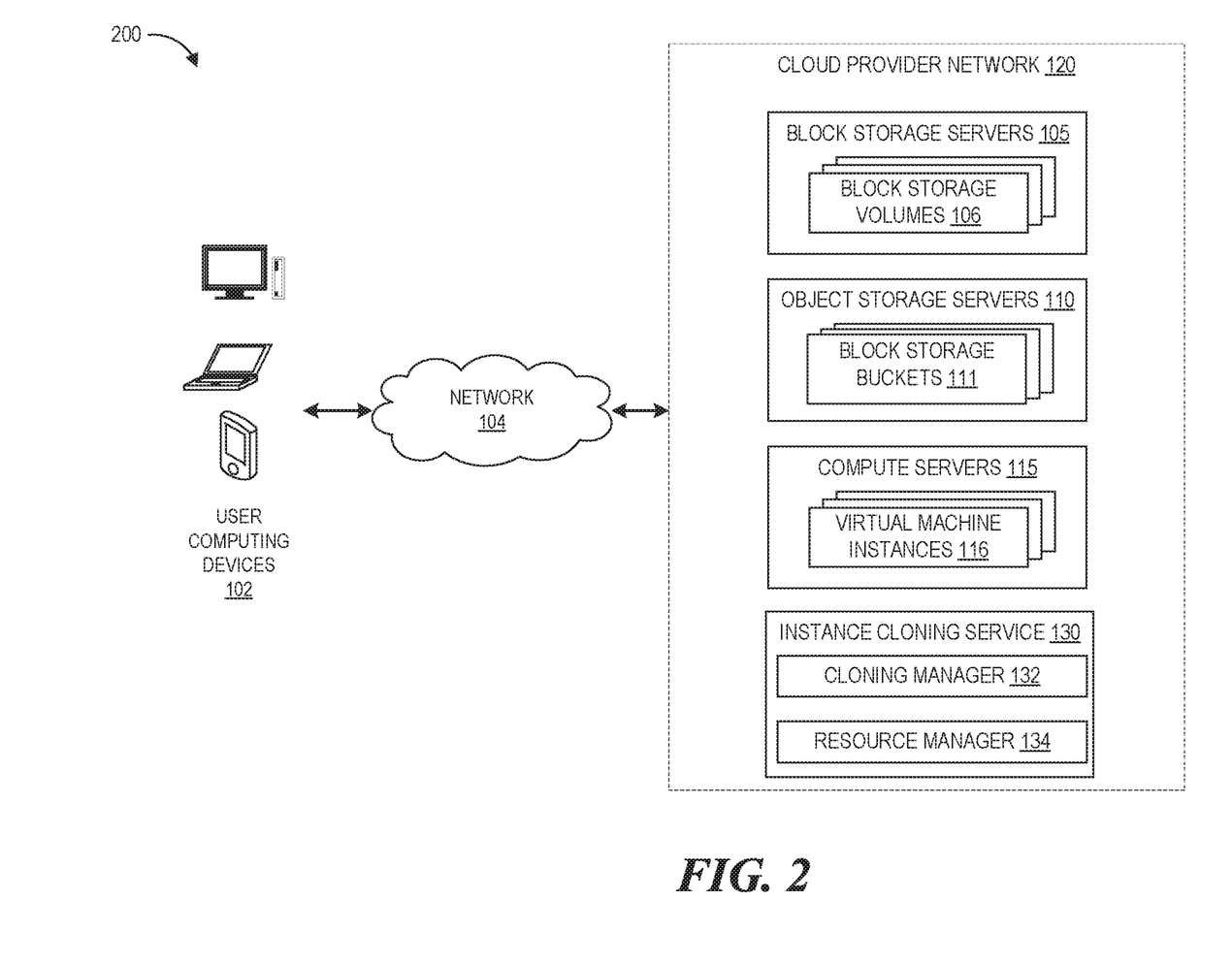
FIG. 2 depicts a schematic diagram of a network environment in which the cloud provider network of FIG. 1 is used to implement an instance cloning service in accordance with aspects of the present disclosure.

FIG. 2 depicts a more detailed computing environment 200 in which an instance cloning service 130 is implemented on the cloud provider network 120. More specifically, the computing environment 200 includes the user computing devices 102 in communication with the cloud provider network 120 via the network 104. As illustrated in FIG. 1, the cloud provider network 102 includes the block storage servers 105, object storage servers 110, and the compute servers 115. Additionally, the cloud provider network 102 of FIG. 2 includes the instance cloning service 130 including a cloning manager 132 and a resource manager 134.

The block storage servers 105 host block storage volumes 106, which can be attached to the virtual machine instances 116 (e.g., those cloned according to the techniques described herein) hosted by the compute servers 115. The virtual machine instances 116 can run applications on behalf of the users of the cloud provider network 120, and such applications can access the data stored on the block storage volumes 106 and/or the data stored in the block storage buckets 111 (e.g., image data to be processed by the application, program code to be executed on the virtual machine instance, or any other data that may not be present on the block storage volumes 106) hosted by the object storage servers 110 as needed.

The instance cloning service 130 may provide a set of APIs that can be used by the users of the user computing devices 102 to request cloning of the virtual machine instances 116 to which they have access and to manage the resources of the virtual machine instances created using cloning. The cloning manager 132 of the instance cloning service 130 may determine that an original virtual machine instance is to be cloned and create one or more new virtual machine instances based on the original virtual machine instance. The resource manager 134 of the instance cloning service 130 may configure or re-configure the resources of the original and new virtual machine instances by attaching and detaching the virtual machine instances to various resources available on the cloud provider network 120. In some embodiments, the instance cloning service 130 is implemented on one or more of the virtual machines 116. In other embodiments, the instance cloning service 130 is implemented using bare-metal computing resources. The operations of the instance cloning service 130 are described in greater detail below with reference to FIGS. 3-6.

Example Configurations of Virtual Machines and Resources

Figure 3:
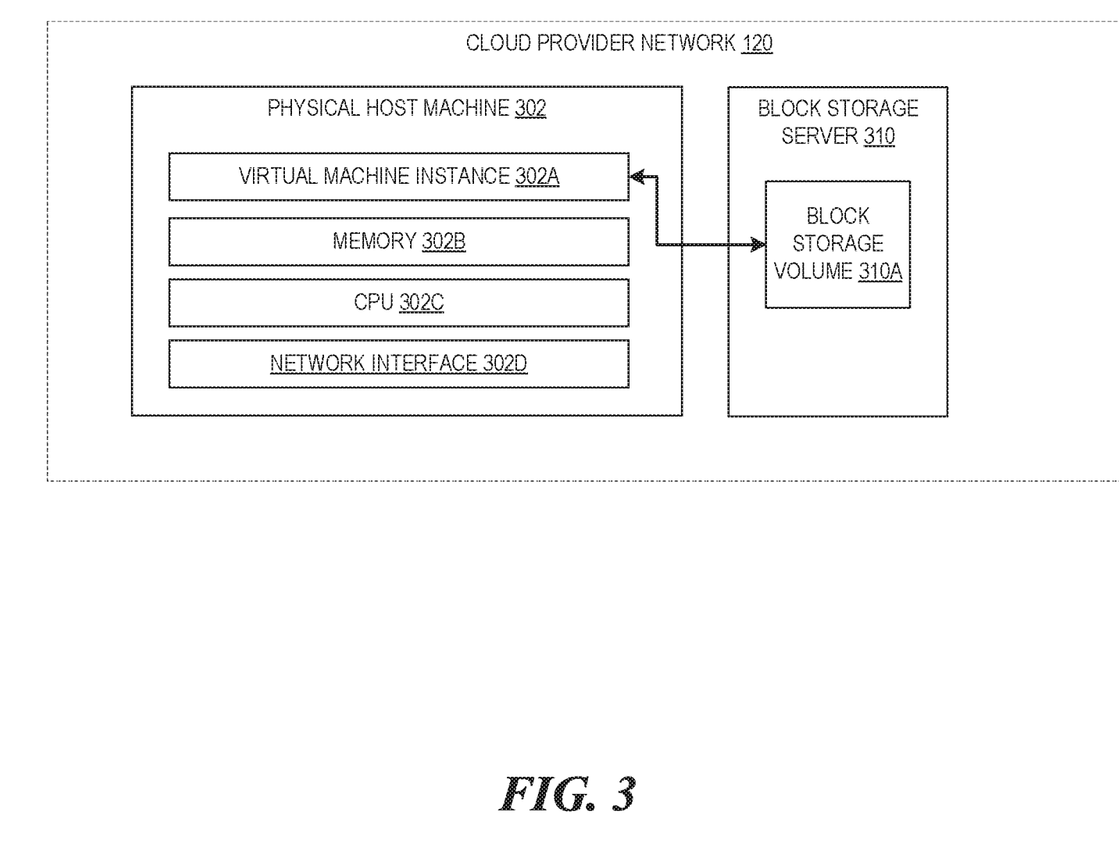
FIG. 3 depicts a block diagram of an embodiment including a virtual machine instance prior to the cloning in accordance with aspects of the present disclosure.
Figure 4:
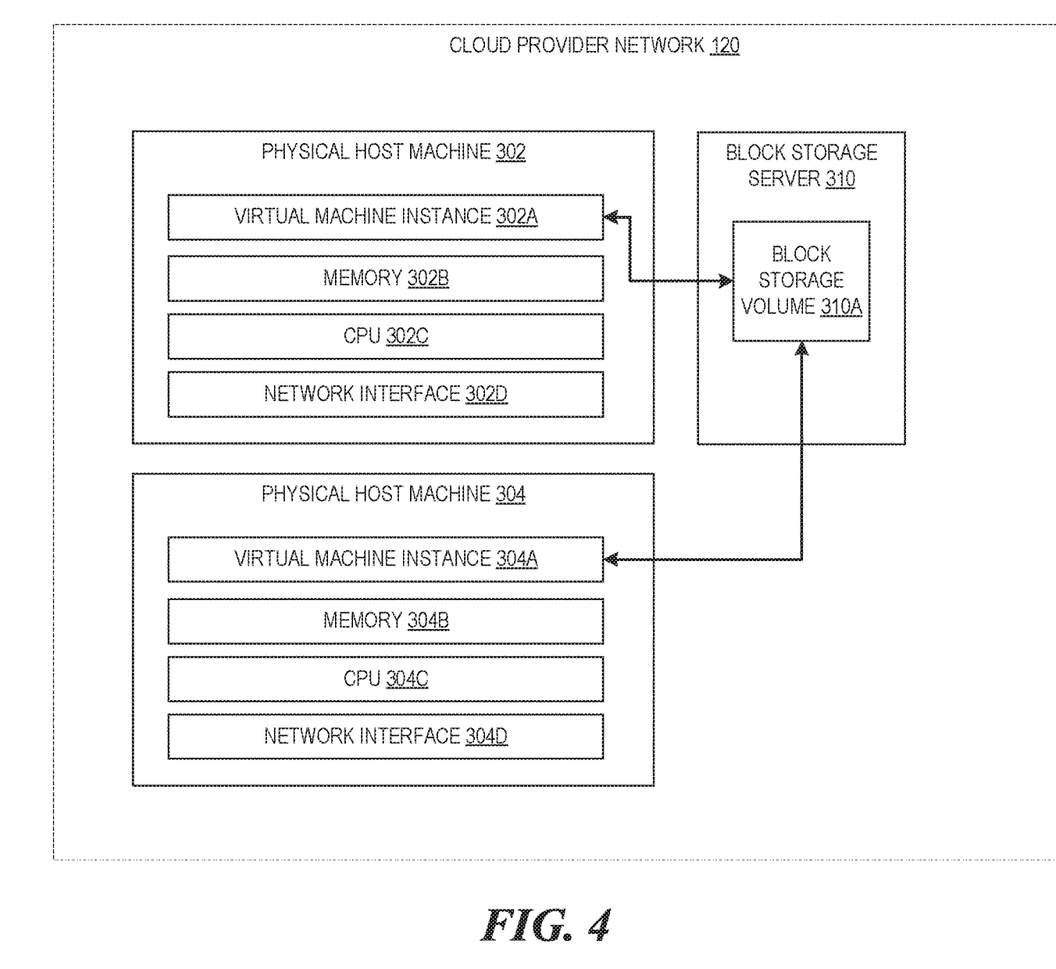
FIG. 4 depicts a block diagram of an embodiment in which a virtual machine instance has been cloned in accordance with aspects of the present disclosure.
Figure 5:
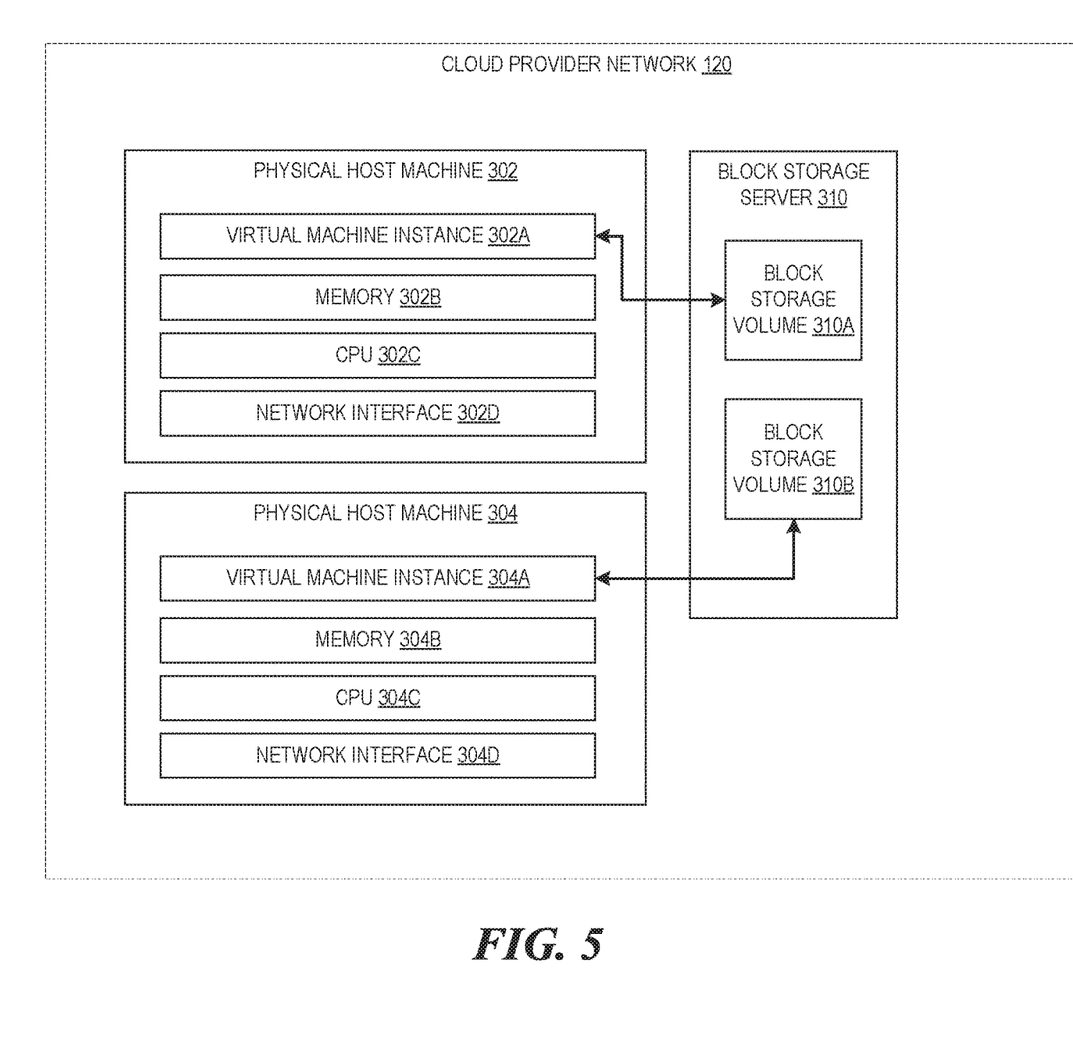
FIG. 5 depicts a block diagram of another embodiment in which a virtual machine instance has been cloned in accordance with aspects of the present disclosure.

FIGS. 3-5 depict example configurations of virtual machines instances and the resources attached to the virtual machine instances. More specifically, FIG. 3 depicts a block diagram of an embodiment including a virtual machine instance prior to being cloned, FIG. 4 depicts a block diagram of an embodiment in which a new virtual machine instance has been created by cloning the original instance of FIG. 3, and the new instance has been attached to the block storage volume of the original instance, and FIG. 5 depicts a block diagram of an embodiment in which the original instance and the new instance are attached to different block storage volumes.

In the example of FIG. 3, the cloud provider network 120 includes a physical host machine 302, which includes a virtual machine instance 302A, memory 302B, CPU 302C, and network interface 302D. Further, the cloud provider network 120 of FIG. 3 includes a block storage server 310, which includes a block storage volume 310A attached to the virtual machine instance 302A. In the configuration of FIG. 3, the cloud provider network 120 (or a component thereof such as the instance cloning service 130) may receive a request to clone the virtual machine instance 302A. Alternatively, the cloud provider network 120 may determine, without receiving a request from a user/client computing device associated with a user/client of the cloud provider network 120, that the virtual machine instance 302A should be cloned. In response, the cloud provider network 120 may create a new virtual machine instance as shown in FIG. 4.

In the example of FIG. 4, the cloud provider network 120 includes the physical host machine 302 and the block storage server 310 of FIG. 3, and additional includes a physical host machine 304, which includes a virtual machine instance 304A, memory 304B, CPU 304C, and network interface 304D. Here, the virtual machine instance 304A is attached to the block storage volume 310A to which the virtual machine instance 302A is attached. In the example of FIG. 4, the virtual machine instances 302A and 304A both share the block storage volume 310A. When multiple instances are attached to the same volume, the I/O requests to the volume may be coordinated at the application level such that the instances do not modify the data written by each other. The techniques that may be used to attach multiple virtual machine instances to a single block storage volume are described in greater detail in U.S. application Ser. No. 16/560,859, titled "BLOCK-STORAGE SERVICE SUPPORTING MULTI-ATTACH AND HEALTH CHECK FAILOVER MECHANISM," which is incorporated herein by reference in its entirety. Beneficially, allowing an instance and its clone to both attach to the same underlying volume (at least in the initial period after cloning) can result in the clone being available for use more quickly than if the volume required replication to a new volume for attachment to the clone.

In the example of FIG. 5, the cloud provider network 120 includes the physical host machine 302, the physical host machine 304, and the block storage server 310 of FIG. 4, and the block storage server 310 additionally includes a block storage volume 310B. The block storage volume 310B may be a new block storage volume created from a snapshot of the block storage volume 310A (e.g., snapshot of the block storage volume 310A at the time of cloning). Here, the virtual machine instance 304A is attached to the block storage volume 310B instead of the block storage volume 310A. In some embodiments, the cloud provider network 120 arrives at the configuration of FIG. 5 directly from the configuration of FIG. 3 as a result of the cloning. In other embodiments, the cloud provider network 120 arrives at the configuration of FIG. 5 via the configuration of FIG. 4 as a result of a decision to attach the virtual machine instances 302A and 304A to different block storage volumes.

The block storage volumes illustrated in FIGS. 3-5 may be hosted by one or more physical host machines in the cloud provider network 120. In some embodiments, the virtual machine instances are hosted by a first set of physical host machines, and the block storage volumes are hosted by a second set of physical host machines having different hardware configurations than the first set of physical host machines. For example, the first set of physical host machines may be optimized for supporting virtual machine instances, and the second set of physical host machines may be optimized for supporting block storage volumes. In other embodiments, the virtual machine instances are hosted by physical host machines having the same or similar hardware configurations as the physical host machines hosting the block storage volumes. In yet other embodiments, the storage volumes illustrated in FIGS. 3-5 are hosted by one or more virtual machine instances in the cloud provider network 120.

Example Routine for Cloning a Virtual Machine and Configuring its Resources

Figure 6:
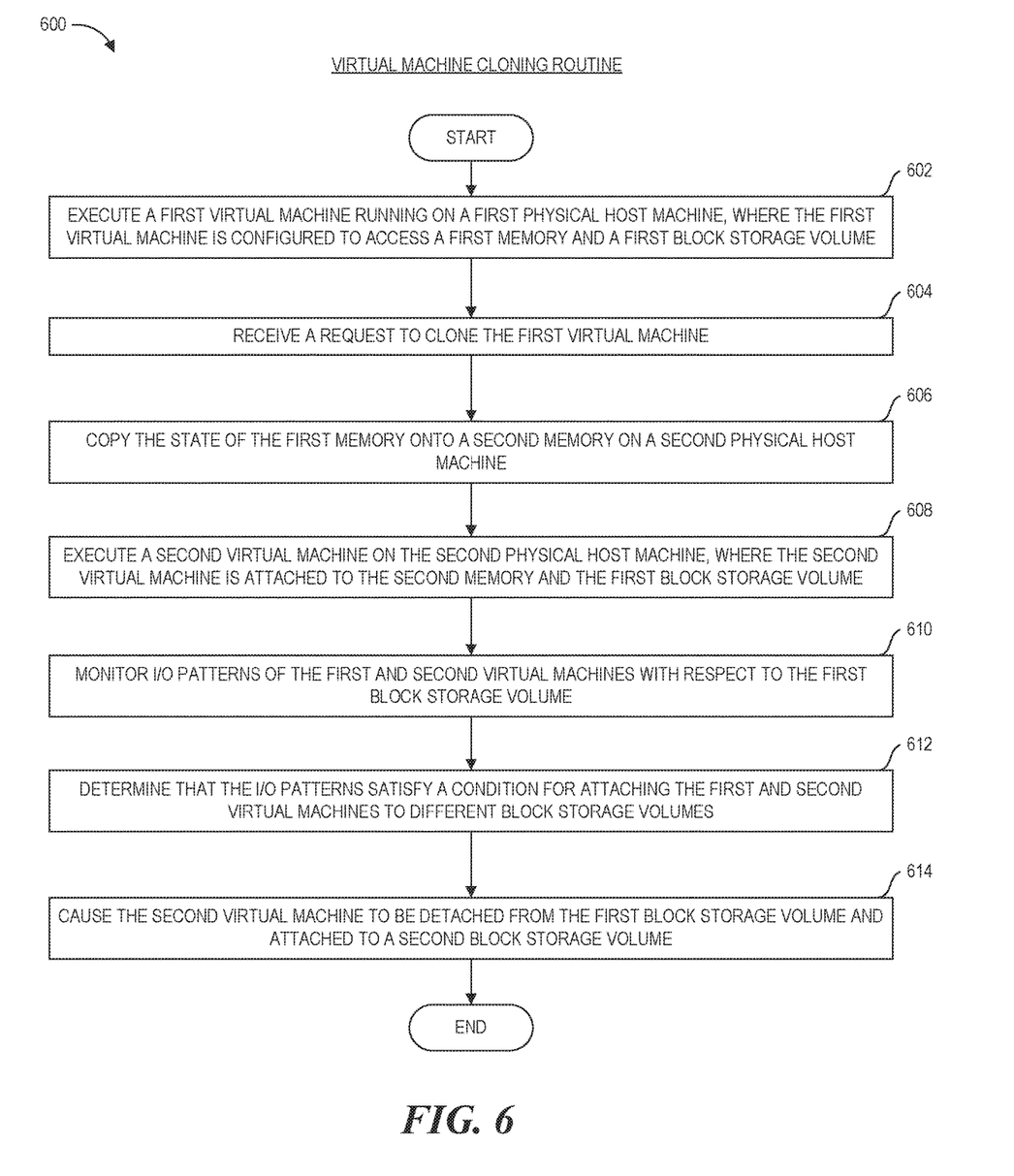
FIG. 6 is a flowchart of an example process for cloning a virtual machine instance in accordance with aspects of the present disclosure.

As illustrated in FIGS. 3-5, the instance cloning service 130 can clone a virtual machine and copy the state of the virtual machine's resources over to the new virtual machine, and the instance cloning service 130 may configure the resources of the new virtual machine such that some or all of the resources are separately allocated for the new virtual machine and not shared with the original virtual machine. The instance cloning service 130 may determine whether to allow the new virtual machine to share some of its resources with the original virtual machine, for example, based on a request from a user who have access to the original virtual machine, or based on whether the shared resource(s) can meet the performance demands of both the original and new virtual machines. By allowing additional virtual machines to be cloned from a running virtual machine (as opposed to being provisioned from scratch or from a previously stored copy of a virtual machine), the instance cloning service 130 reduces the amount of time required to provision and configure such additional virtual machines. Further, by providing various options for managing the resources of the new virtual machines, the instance cloning service 130 provides flexibility to the users (e.g., users of the cloud provider network providing the instance cloning service 130). With reference to FIG. 6, the virtual machine cloning process is described in greater detail.

FIG. 6 depicts an illustrative routine 600 for cloning a virtual machine in accordance with aspects of the present disclosure. The routine 600 may be carried out, for example, by the instance cloning service 130 or one or more other components of the cloud provider network 120 described herein. For convenience, the steps of routine 600 are described as being performed by the instance cloning service 130. For example, the instance cloning service 130 may include one or more hardware computing devices and non-transitory physical computer storage storing instructions that, when executed by the one or more hardware computing devices, cause the one or more hardware computing devices to perform the steps of the routine 600. Although memory and block storage volume are used as examples in FIG. 6, similar techniques can be applied to other resources such as CPU, local storage, remote storage, and network resources.

The routine 600 begins at 602, wherein the instance cloning service 130 executes a first virtual machine running on a first physical host machine, where the first virtual machine is configured to access a first memory and a first block storage volume. In some embodiments, the first virtual machine belongs to a user of the cloud provider network on which the instance cloning service 130 is implemented, and the first virtual machine performs tasks specified by the user (e.g., via one or more APIs provided by the cloud provider network). The first virtual machine may have a finite amount of resources allocated thereto. For example, the first virtual machine may be allocated 8 CPU cores, 64 GB of memory, 300 GB of storage, and up to 10 Gbps of network bandwidth.

At block 604, the instance cloning service 130 receives a request to clone the first virtual machine. For example, to obtain more compute capacity that has access to the same state of the resources (e.g., information stored in the memory, local storage, etc. of the first virtual machine), the user of the first virtual machine may request that the first virtual machine be cloned. In some embodiments, the cloud provider network provides an API that can be called by the user to clone one or more virtual machines that belong to the user. In some cases, the cloud provider network 120 may determine that additional compute capacity needs to be added to a pool of virtual machine instances (e.g., to increase the pool's ability to handle incoming compute requests), and determine that one of the virtual machine instances in the pool is to be cloned and added to the pool.

At block 606, the instance cloning service 130 copies the state of the first memory onto a second memory on a second physical host machine. In some embodiments, the second memory has the same size as the first memory. In other embodiments, the second memory has a different size than the first memory but the second memory has a size large enough to store all of the information stored in the first memory at the time of cloning the first virtual machine. Additionally, the instance cloning service 130 may copy the information stored in a network buffer of the first virtual machine, information stored in a storage volume buffer of the first block storage volume, and/or the state of any other resources of the first virtual machine over to the second physical host machine.

At block 608, the instance cloning service 130 executes a second virtual machine on the second physical host machine, where the second virtual machine is configured to access the second memory and the first block storage volume. The second physical host machine may be geographically separated from the first physical host machine.

At block 610, the instance cloning service 130 monitors I/O patterns of the first and second virtual machines with respect to the first block storage volume. For example, monitoring the level of the I/O requests may include monitoring a sum of a number of I/O operations requested by the first virtual machine per second and a number of I/O operations requested by the second virtual machine per second.

At block 612, the instance cloning service 130 determines that the I/O patterns satisfy a condition for attaching the first and second virtual machines to different block storage volumes. For example, the instance cloning service 103 determines that the I/O patterns satisfy the condition based on the sum of the number of I/O operations requested by the first virtual machine per second and the number of I/O operations requested by the second virtual machine per second having reached or exceeded the I/O operations per second (TOPS) value associated with the first block storage volume.

At block 614, the instance cloning service 130 causes the second virtual machine to be detached from the first block storage volume and attached to a second block storage volume. In some embodiment, the first block storage volume and the second block storage volume both point to the same copy of the data, and as write requests are received from the first and second virtual machines, additional pieces of write data (or the delta between the write data and the original data) are saved and maintained separately for the respective virtual machines (e.g., copy-on-write). For example, in response to detecting a request from the second virtual machine to write data to the first block storage volume, the instance cloning service 130 may cause the data to be written to a separate location not accessible by the first virtual machine, as part of the second block storage volume. Alternatively, the instance cloning service 130 may create a new block storage volume and populate it with the data stored in the first block storage volume. Although blocks 610-614 describe monitoring the I/O patterns and attaching the second virtual machine to be attached to a new block storage volume, in other embodiments, such I/O patterns are no monitored for the purpose of attaching the virtual machines to separate block storage volumes, and virtual machines are attached to separate block storage volumes in response to a request from the entity that requested the cloning, such as the user computing device 102 or another component within the cloud provider network 120. The routine 600 may then end.

The method 600 can include fewer, more, or different blocks than those illustrated in FIG. 6 and/or one or more blocks illustrated in FIG. 6 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Instance Cloning Service

Figure 7:
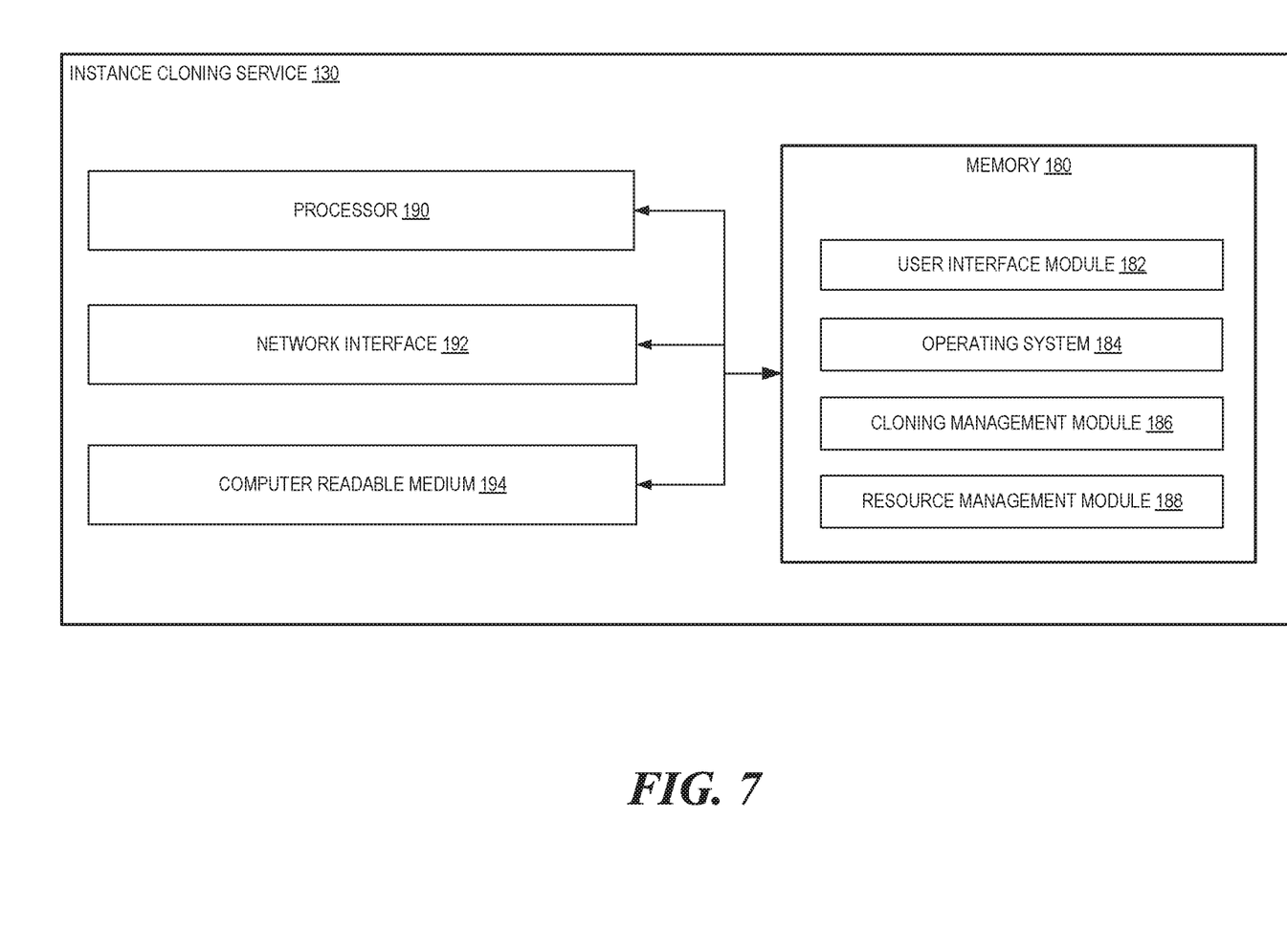
FIG. 7 depicts a general architecture of a computing device or system providing an instance cloning service in accordance with aspects of the present disclosure.

FIG. 7 depicts an example architecture of a computing system (referred to as the instance cloning service 130) that can be used to perform one or more of the techniques described herein or illustrated in FIGS. 1-6. The general architecture of the instance cloning service 130 depicted in FIG. 7 includes an arrangement of computer hardware and software modules that may be used to implement one or more aspects of the present disclosure. The instance cloning service 130 may include many more (or fewer) elements than those shown in FIG. 7. It is not necessary, however, that all of these elements be shown in order to provide an enabling disclosure. As illustrated, the instance cloning service 130 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIGS. 1 and 2.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 184 that provides computer program instructions for use by the processor 190 in the general administration and operation of the instance cloning service 130. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device (e.g., user computing device 102 of FIG. 2), e.g., via a navigation and/or browsing interface such as a browser or application installed on the user computing device. In addition, the memory 180 may include or communicate with one or more data stores.

In addition to and/or in combination with the user interface module 182, the memory 180 may include a cloning management module 186 and a resource management module 188 that may be executed by the processor 190. In one embodiment, the cloning management module 186 and the resource management module 188 individually or collectively implement various aspects of the present disclosure, e.g., receiving a request to clone a virtual machine instance, instantiating a new virtual machine instance, copying over the state information of the resources of the original virtual machine instance, and attaching, detaching, and re-attaching virtual machine instances to block storage volumes as needed, and/or other aspects discussed herein or illustrated in FIGS. 1-6.

While the cloning management module 186 and the resource management module 188 are shown in FIG. 7 as part of the instance cloning service 130, in other embodiments, all or a portion of the cloning management module 186 and the resource management module 188 may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the instance cloning service 130. It will also be appreciated that, in some embodiments, a user computing device (e.g., the user computing device 102 of FIG. 2) may implement functionality that is otherwise described herein as being implemented by the elements and/or modules of the instance cloning service 130. For example, the user computing device 102 may receive code modules or other instructions from the instance cloning service 130 and/or other components of the cloud provider network 120 via the network 104 that are executed by the user computing device 102 to implement various aspects of the present disclosure.

Other Considerations

Although in some embodiments, the original virtual machine instance is described as being cloned onto a different physical host machine that is hosting the original virtual machine instance, in other embodiments, both the original virtual machine instance and the new virtual machine instance are hosted on the same physical host machine.

Although in some embodiments in which the original virtual machine instance and the new virtual machine instance are to be attached to different block storage volumes, the new virtual machine instance is described as being attached or moved to a new block storage volume, in other embodiments, the new virtual machine instance is attached (or remains attached) to the block storage volume originally attached to the original virtual machine instance, and the original virtual machine instance is attached to the new block storage volume.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:
   a first set of physical host machines comprising one or more processors and hosting a plurality of virtual machine instances;
   a second set of physical host machines hosting a plurality of block storage volumes usable by the plurality of virtual machine instances; and
   an instance cloning service comprising computer hardware, wherein the instance cloning service is configured to:
      receive a request to clone a first virtual machine instance of the plurality of virtual machine instances, wherein the first virtual machine instance is hosted on a first physical host machine of the first set of physical host machines and is attached to a first block storage volume of the plurality of block storage volumes;
      identify a second physical host machine of the first set of physical host machines to be used for cloning the first virtual machine instance;
      copy state information associated with the first virtual machine instance onto the second physical host machine;
      cause the second virtual machine instance to be executed, based at least on the state information copied onto the second physical host machine, on the second physical host machine;
      attach the second virtual machine instance to the first block storage volume while the first virtual machine instance is still attached to the first block storage volume such that all input/output (I/O) requests from the first virtual machine instance and all I/O requests from the second virtual machine instance are both directed to the first block storage volume;
      monitor a collective level of the I/O requests from the first virtual machine instance and the second virtual machine instance;
      determine that the collective level of the I/O requests from the first virtual machine instance and the second virtual machine instance has reached or exceeded an I/O threshold level associated with the first block storage volume; and
      cause the second virtual machine instance to be detached from the first block storage volume and attached to a second block storage volume that is different from the first block storage volume and unattached, prior to the determination, to the second virtual machine instance, such that I/O requests from the first virtual machine instance are directed to the first block storage volume and I/O requests from the second virtual machine instance are directed to the second block storage volume.

2. The cloud provider system of claim 1, wherein monitoring the collective level of the I/O requests comprises monitoring a sum of a number of I/O operations requested by the first virtual machine instance per second and a number of I/O operations requested by the second virtual machine instance per second, and wherein the I/O threshold level include s an I/O operations per second (IOPS) value associated with the first block storage volume.

3. The cloud provider system of claim 1, wherein the state information includes one or more of (a) information stored in a memory of the first virtual machine instance, (b) information stored in a network buffer of the first virtual machine instance, and (c) information stored in a storage volume buffer of the first block storage.

4. The cloud provider system of claim 1, wherein causing the second virtual machine instance to be detached from the first block storage volume and attached to a second block storage volume different from the first block storage volume comprises detecting a request from the second virtual machine instance to write data to the first block storage volume and causing the data to be written to the second block storage volume.

5. A computer-implemented method, comprising:
   determining that a first virtual machine instance hosted on a first physical host machine is to be cloned, wherein the first virtual machine instance is attached to a first block storage volume implemented on a cloud block storage server;
   using live migration to copy state information associated with the first virtual machine instance onto a second physical host machine different from the first physical host machine;

executing the second virtual machine instance, based at least on the state information copied onto the second physical host machine, on the second physical host machine;
attaching the second virtual machine instance to the first block storage volume while the first virtual machine instance is still attached to the first block storage volume such that all input/output (I/O) requests from the first virtual machine instance and all I/O requests from the second virtual machine instance are both directed to the first block storage volume;
monitoring a collective level of the I/O requests from the first virtual machine instance and the second virtual machine instance;
determining that the collective level of the I/O requests from the first virtual machine instance and the second virtual machine instance has reached or exceeded an I/O threshold level associated with the first block storage volume; and
causing the second virtual machine instance to be detached from the first block storage volume and attached to a second block storage volume that is different from the first block storage volume, implemented on the cloud block storage server, and unattached, prior to the determination that the collective level has reached or exceeded the I/O threshold level, to the second virtual machine instance, such that I/O requests from the first virtual machine instance are directed to the first block storage volume and I/O requests from the second virtual machine instance are directed to the second block storage volume.

6. The computer-implemented method of claim 5, further comprising detecting a request from the second virtual machine instance to write data to the first block storage volume and causing the data to be written to the second block storage volume.

7. The computer-implemented method of claim 5, wherein the state information includes information stored in a memory of the first virtual machine instance.

8. The computer-implemented method of claim 5, wherein the state information includes information stored in a network buffer of the first virtual machine instance.

9. The computer-implemented method of claim 5, wherein the state information includes information stored in a storage volume buffer of the first block storage volume.

10. The computer-implemented method of claim 5, further comprising receiving an instance cloning request clone the first virtual machine instance from a user computing device associated with the first virtual machine instance.

11. The computer-implemented method of claim 10, wherein the instance cloning request indicates that the first virtual machine instance and its clone should be attached to the same block storage volume.

12. A non-transitory computer-readable medium storing instructions that, when executed by a computing system, cause the computing system to perform operations comprising:
determining that a first virtual machine instance hosted on a first physical host machine is to be cloned, wherein the first virtual machine instance is attached to a first block storage volume implemented on a cloud block storage server;
using live migration to copy state information associated with the first virtual machine instance onto a second physical host machine different from the first physical host machine;
executing the second virtual machine instance, based at least on the state information copied onto the second physical host machine, on the second physical host machine;
attaching the second virtual machine instance to the first block storage volume while the first virtual machine instance is still attached to the first block storage volume such that all input/output (I/O) requests from the first virtual machine instance and all I/O requests from the second virtual machine instance are both directed to the first block storage volume;
monitoring a collective level of the I/O requests from the first virtual machine instance and the second virtual machine instance;
determining that the collective level of the I/O requests from the first virtual machine instance and the second virtual machine instance has reached or exceeded an I/O threshold level associated with the first block storage volume; and
causing the second virtual machine instance to be detached from the first block storage volume and attached to a second block storage volume that is different from the first block storage volume, implemented on the cloud block storage server, and unattached, prior to the determination that the collective level has reached or exceeded the I/O threshold level, to the second virtual machine instance, such that I/O requests from the first virtual machine instance are directed to the first block storage volume and I/O requests from the second virtual machine instance are directed to the second block storage volume.

13. The non-transitory computer-readable medium of claim 12, wherein the operations further comprise detecting a request from the second virtual machine instance to write data to the first block storage volume and causing the data to be written to the second block storage volume implemented on the cloud block storage server.

14. The non-transitory computer-readable medium of claim 12, wherein the state information includes one or more of (a) information stored in a memory of the first virtual machine instance, (b) information stored in a network buffer of the first virtual machine instance, and (c) information stored in a storage volume buffer of the first block storage volume.

15. The non-transitory computer-readable medium of claim 12, wherein the operations further comprise receiving an instance cloning request clone the first virtual machine instance from a user computing device associated with the first virtual machine instance.

16. The non-transitory computer-readable medium of claim 15, wherein the instance cloning request indicates that the first virtual machine instance and its clone should be attached to the same block storage volume.

17. The non-transitory computer-readable medium of claim 12, wherein the first physical host machine and the second physical host machine are associated with a first set of hardware configurations that is different from a second set of hardware configurations associated with a third physical host machine hosting the first block storage volume.

18. The non-transitory computer-readable medium of claim 12, wherein the first physical host machine and the second physical host machine are associated with a set of hardware configurations that is identical to that associated with a third physical host machine hosting the first block storage volume.

* * * * *